(12) United States Patent
Aslam et al.

(10) Patent No.: US 9,774,526 B2
(45) Date of Patent: Sep. 26, 2017

(54) OPERATING A PORT SHARED BY MULTIPLE CONTROLLERS IN A SOFTWARE DEFINED NETWORK

(71) Applicant: International Business Machines Corporation, Armonk, NY (US)

(72) Inventors: Muhammad Sohaib Aslam, Ontario (CA); Tiia J. Salo, Cary, NC (US); Ahron B. Train, Ontario (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 96 days.

(21) Appl. No.: 14/926,228

(22) Filed: Oct. 29, 2015

(65) Prior Publication Data
US 2017/0126546 A1    May 4, 2017

(51) Int. Cl.
*H04L 12/725* (2013.01)
*H04L 12/721* (2013.01)

(52) U.S. Cl.
CPC ............ *H04L 45/30* (2013.01); *H04L 45/566* (2013.01)

(58) Field of Classification Search
CPC ............................. H04L 45/30; H04L 45/566
See application file for complete search history.

(56) References Cited

U.S. PATENT DOCUMENTS

| | | | |
|---|---|---|---|
| 8,743,889 B2 | 6/2014 | Koponen et al. | |
| 8,761,036 B2 | 6/2014 | Fulton et al. | |
| 8,817,621 B2 | 8/2014 | Casado et al. | |
| 8,837,493 B2 | 9/2014 | Casado et al. | |
| 8,842,679 B2 | 9/2014 | Koponen et al. | |
| 2011/0267952 A1* | 11/2011 | Ko ................... | H04L 43/0864 370/237 |
| 2014/0325038 A1 | 10/2014 | Kis | |

OTHER PUBLICATIONS

Bakshi; Considerations for Software Defined Networking (SDN): Approaches and Use Cases, 2013 IEEE.
Koponen et al; Network Virtualization in Multi-tenant Datacenters, Apr. 2-4, 2014, Seattle, WA, USA, 11th USENIX Symposium on Networked Systems Design and Implementation.

* cited by examiner

*Primary Examiner* — Omar Ghowrwal
(74) *Attorney, Agent, or Firm* — Garg Law Firm, PLLC; Rakesh Garg; Isaac Gooshaw

(57) ABSTRACT

An instruction from a controller is received at an application executing using a processor, the controller being a Software Defined Network (SDN) controller operating in an SDN. A determination is made, using the processor, that the instruction applies to an identifier located in a data packet, the data packet passing through a shared port, the shared port being shared by the controller and a concurrently operating second controller in the SDN. A period of effectiveness of the instruction is initialized. A command is sent to a switch to apply a network setting configured by the controller to handle the data packet, where the shared port is located at the switch in the SDN.

19 Claims, 5 Drawing Sheets

OPERATING A PORT SHARED BY MULTIPLE CONTROLLERS IN A SOFTWARE DEFINED NETWORK

TECHNICAL FIELD

The present invention relates generally to a method, system, and computer program product for operating a multi-tenant software defined network. More particularly, the present invention relates to a method, system, and computer program product for operating a shared port in a multi-tenant software defined network.

BACKGROUND

A data processing environment comprises a variety of hardware, software, and firmware networking components. A physical network, also called a data plane or an underlay, is a network of physical components where actual networking operations are performed and computational workloads are executed.

Techniques are available presently to construct a logical network, also known as a software defined network (SDN) overlay (hereinafter interchangeably, "SDN" or "overlay"), from such networking components. Essentially, networking components are abstracted into corresponding logical or virtual representations, and the abstractions are used to define the SDN. In other words, an SDN is a logical network formed and operated using logical representations of the underlying physical components.

Physical networks usually exist within the demarcated boundary of the data processing environment whose physical components are utilized in the physical network. Unlike a physical network, an SDN can be designed to span across one or more data processing environments. For example, while a physical network may be contained within a datacenter, an SDN may span across one or more datacenters.

As an example, a logical representation of a hypervisor can participate in an SDN, such that a function attributed to the logical representation of the hypervisor in the SDN is actually performed by the underlying hypervisor component in the underlay. Similarly, a logical representation of a switch or a networking gateway can participate in an SDN, such that a function attributed to the logical representation of the switch or the networking gateway in the SDN is actually performed by the underlying switch or the networking gateway component, respectively, in the underlay.

In an SDN, because the actual physical networking components that perform the networking functions are abstracted into logical entities representing the networking functionality offered by those components and not the actual implementations of those functionalities, something is needed to direct those networking functionality into a functioning logical network. An SDN controller is a component that manages and operates the logical networking components within an SDN.

Henceforth in this disclosure, any reference to a component within the context of an SDN is a reference to a logical representation of the component, which participates in the SDN, unless expressly distinguished where the reference is made. For example, a reference to a hypervisor in communication with an SDN controller is a reference to a logical representation of the hypervisor that operates in the SDN managed by the SDN controller and not to the hypervisor component of a machine that actually performs a task in the physical network.

Cloud computing is one of the emerging technologies that is enabling flexible and efficient computing. Cloud computing offers an on-demand model for computing that reduces, or in some cases, completely avoids the hardware and software maintenance costs for an end user of the computing services.

Cloud computing also generally has a lower total cost of ownership as compared to captive computing capabilities, such as dedicated/owned data processing systems. The flexibility of using selected computing resources when they are needed, as a service, is a key advantage of cloud computing that endears the cloud model to all types of users, including business enterprises, high power computing groups, and individual users.

One of the models for offering cloud computing to a user is Infrastructure as a Service (IaaS). The IaaS model of cloud computing provides the user with a data processing environment according to the user's request. In other words, the IaaS model provides to the user "machine time" or network time on a data processing system or networking component of the user's desired configuration. Typically, the data processing environment in the IaaS model takes the form of virtual machines (VMs) created according to a user-provided specification and allocated to the user for the duration of the user's workload. A networking component, such as a switch in the IaaS model takes the form of virtual switches which are configured according to a user's preferred networking settings and allocated to the user for the duration of the user's virtual network remains in existence.

SUMMARY

The illustrative embodiments provide a method, system, and computer program product. An embodiment includes a method. The embodiment receives, at an application executing using a processor, an instruction from a controller, the controller being a Software Defined Network (SDN) controller operating in an SDN. The embodiment determines, using the processor, that the instruction applies to an identifier located in a data packet, the data packet passing through a shared port, the shared port being shared by the controller and a concurrently operating second controller in the SDN. The embodiment initializes a period of effectiveness of the instruction. The embodiment sends a command to a switch to apply a network setting configured by the controller to handle the data packet, wherein the shared port is located at the switch in the SDN.

Another embodiment includes a computer program product comprising one or more computer-readable storage devices, and program instructions stored on at least one of the one or more storage devices.

Another embodiment includes a computer system comprising one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
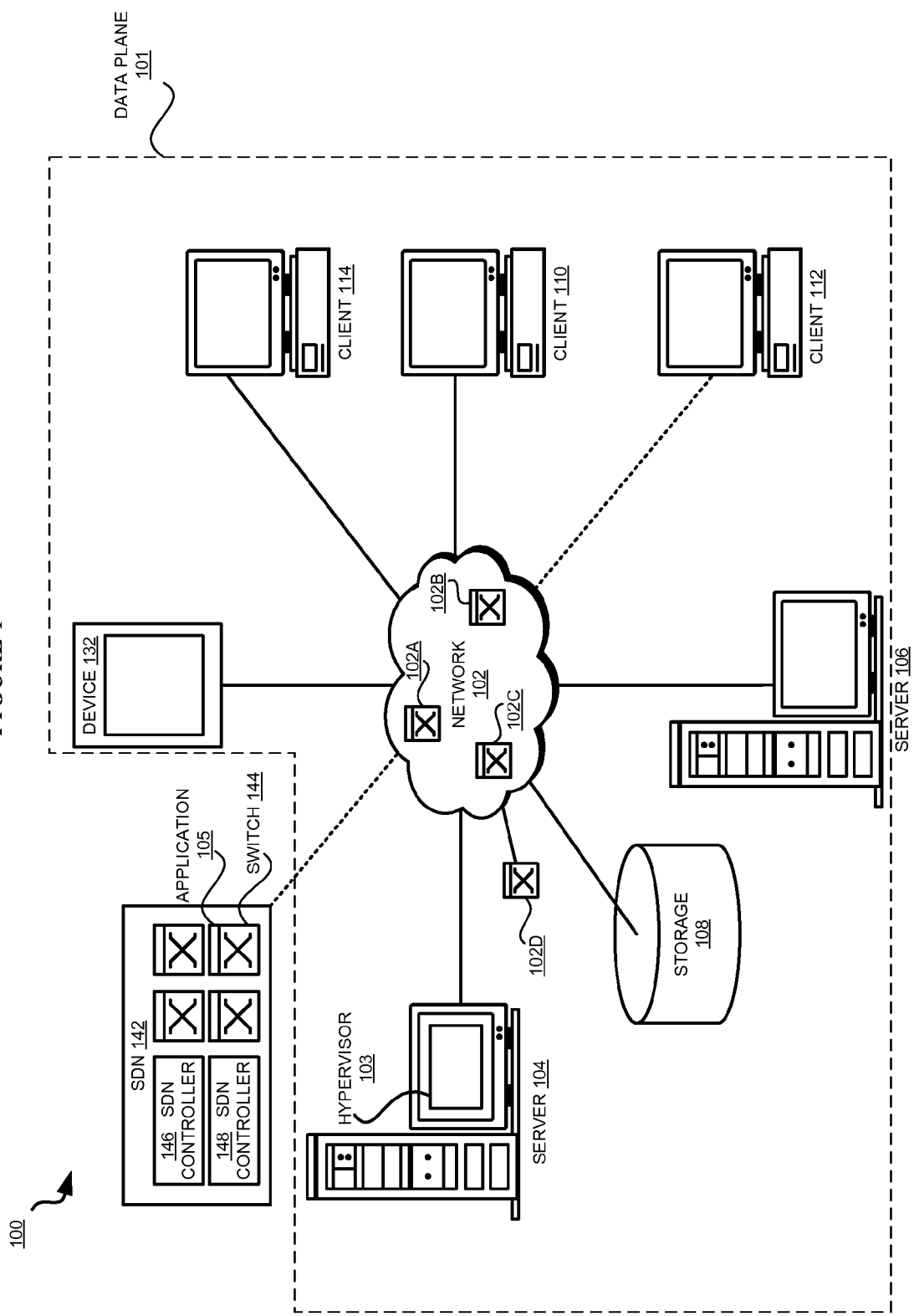
FIG. 1 depicts a block diagram of a network of data processing systems in which illustrative embodiments may be implemented.

The illustrative embodiments recognize that networking is a major point of contention in cloud environments. An SDN is used to address manageability and scalability issues in a cloud environment.

One of the key management problems in cloud environments is when multiple tenants are operating and using the components of the cloud. A tenant is an entity with a corresponding configuration that uses the components and services of the cloud. For example, the cloud infrastructure may have a physical network of physical components operating in the data plane. For a tenant, an SDN controller (also referred to herein as a "controller") in a virtual network may be configured to interact with the virtual components in the SDN, e.g., according to an IaaS subscription of the tenant.

Presently, SDN implementations define one controller to manage the network elements, e.g., switches for a tenant in the SDN. The current SDN draft specification supports multiple controllers, but the multiple controllers have to be in a master-slave configuration, to provide backup or redundancy amongst the controllers.

The illustrative embodiments recognize that support for multi-tenancy is an important need in a cloud environment. Each tenant is configured with an SDN controller for the tenant's IaaS configuration. The tenants in a cloud cannot manipulate the physical network infrastructure, but the SDN defines logical separation between the controllers of the different tenants. The illustrative embodiments recognize that presently, each controller in a multi-tenant SDN is associated with a corresponding isolated part of the data plane.

For example, a data communication port may be a hardware network element in the data plane. There may be numerous such port network elements in the data plane. The illustrative embodiments recognize that presently, different SDN controllers of the different tenants are configured to use different ports in the data plane. A controller configured to use a port in the data plane has access to the network features offered by the network element, such as to create a flow.

However, the illustrative embodiments recognize that in this presently used method of configuring multiple tenants, each controller is associated with a component that the controller manages, e.g., a representation of the port, and all actions that are applicable to that component. Therefore, the illustrative embodiments recognize that a port that is managed by one controller cannot be shared with other controllers. In other words, presently, multiple tenants cannot use the same port in the data plane.

The illustrative embodiments recognize that not being able to share a single port with different tenants is problematic. For example, in a cloud infrastructure, a single endpoint port, e.g., a port of a rack switch, may have a hypervisor that hosts workloads from a number of tenants. Therefore, multiple tenants may need access to the port, without compromising the security of their respective virtual IaaS networks. Stated differently, the illustrative embodiments recognize that presently, if a port receives packets for different tenants, the SDN is unable to determine which of the several controllers should provide the network settings to apply to the switch to process the packet.

The illustrative embodiments used to describe the invention generally address and solve the above-described problems and other problems related to operating an SDN with multiple tenants. The illustrative embodiments provide a method, system, and computer program product for operating a shared port in a multi-tenant SDN.

An embodiment can be implemented as a software application. The application implementing an embodiment can be configured as a modification of an existing physical switch, as a modification of an existing software representation of a switch in an SDN, as a separate application that operates in conjunction with an existing switch or a representation thereof, a standalone application, or some combination thereof. Only as a non-limiting example, and for the clarity of the depictions, an application implementing an embodiment is shown within a switch in an SDN.

Suppose that two SDN controllers are operating in a given SDN. Controller 1 is configured for use with the IaaS network of tenant 1 in the SDN. Controller 2 is configured for use with the IaaS network of tenant 2 in the SDN. In a scenario addressed by the illustrative embodiments, tenants 1 and 2 both need access to one port—the shared port—in the data plane where data packets arrive from one or more resources in the data plane.

As one example, resource R1 may be a database server sending data for tenant 1 on the port, and resource R2 may be a file-server sending data for tenant 2 on the port. As another example, a media server in the cloud may be sending an audio stream to tenant 1 using the port and a video stream to tenant 2 using the port. Generally, within the scope of the illustrative embodiments, any number and any type of resources may send any type of data packets to the port for multiple tenants.

An embodiment requests from a set of two or more controllers, or otherwise causes the controllers in the set to send, information about the resources with which they communicate in their IaaS network (hereinafter, "network" unless distinguished where used). For example, controller 1 may be a controller in tenant 1's network, and controller 2 may be a controller in tenant 2's network. The embodiment receives from controller 1 an identifier of resource R1 that is configured for use by tenant 1. The embodiment receives from controller 2 an identifier of resource R2 that is configured for use by tenant 2.

An identifier of a resource may be, but is not limited to, a Media Access Control (MAC) address, an Internet Protocol (IP) address, a port number at the resource, an identifier included by the resource in all communications with a particular tenant's network, or some combination these and other similarly purposed identifiers. For example, controller 1 may interact with a resource with MAC address A and controller 2 may interact with resources with MAC addresses B, C, and D. As another example, controller 1 may interact with a resource with IP address 192.168.0.1 and controller 2 may interact with resources with MAC addresses 192.168.0.2, 192.168.0.3, and 192.168.0.4. As another example, controller 1 may interact with a resource with IP address and port 192.168.0.1:80 and controller 2 may interact with resources with MAC address and port 192.168.0.1:81. As another example, controller 1 may interact with any resource that sends packets from port 191919 and controller 2 may interact with any resource that sends packets from port 202020. As another example, controller 1 may interact with any resource that uses identifiers 1000000 to 1999999 in its packets, and controller 2 may interact with any resource that uses identifiers 2000000 to 2999999 in its packets. Such identifiers are usually found in an address portion of a data packet.

These examples of identifiers are not intended to be limiting. From this disclosure, those of ordinary skill in the art will be able to conceive many other identifiers and the same are contemplated within the scope of the illustrative embodiments.

In some cases, as in the above examples, different data packets may be distinguishable from one another based on an identifier corresponding to the resources that send different packets, or an identifier corresponding to a relationship between a resource and a controller. In other cases, different data packets may be indistinguishable from one another based on such an identifier. In such cases, an embodiment has to examine additional features of the packets to distinguish between different packets.

For example, a content portion of a data packet can be examined to reveal a type of the content, e.g., whether the content is textual data, audio data, video data, or a combination thereof. As another example, a class of service, priority, quality of service (QoS), or other control information associated with a packet can also help distinguish data packets from one another.

For example, the embodiment receives from controller 1 type "audio" of content that controller 1 manages from resource R1 for tenant 1. The embodiment receives from controller 1 type "video" of content that controller 2 manages from resource R1 for tenant 2. As another example, the embodiment receives from controller 1 priority m-n, which is the priority of packets from resource R1 that controller 1 manages for tenant 1. The embodiment receives from controller 1 priority p-q, which is the priority of packets from resource R1 that controller 1 manages for tenant 1.

These examples of additional packet features are not intended to be limiting. From this disclosure, those of ordinary skill in the art will be able to conceive many other packet features and the same are contemplated within the scope of the illustrative embodiments. For example, a controller can provide an embodiment an identifier of a resource, an additional packet feature, or both.

One embodiment receives an identifier of a resource, an additional packet feature, or both, from a controller prior to receiving any packets at the shared port. The identifier of a resource, the additional packet feature, or both, as received from a controller are collectively referred to herein as an "instruction" received from the controller.

Another embodiment receives a packet at the shared port, or otherwise detects a packet passing through the shared port, prior to receiving an instruction from a controller. For example, a packet may be received at another port at another resource but may have to be accessed by a controller using the shared port thereby making the packet pass through the shared port. The embodiment extracts from an address portion of the packet an identifier of the resource that sent the packet, an additional feature from the content portion of the packet, a control information associated with the packet at the switch, or some combination thereof. The embodiment sends the extracted information to all controllers that are configured to use the shared port. In response to the embodiment sending the extracted information, one controller responds to the embodiment with an affirmative response, an instruction, or both. From the response, the embodiment concludes that the responding controller is the controller whose instructions should be applied to the received packet.

In one embodiment, the controllers only provide an affirmative or a negative response. The embodiment uses the extracted information as the instruction from the controller that provides the affirmative response.

In response to an embodiment receiving an instruction from the controller, the embodiment maintains the information in memory for a period. Particularly, in response to receiving an instruction from a controller, the embodiment initializes a timer, during which if any packets matching the controller instruction are received at the shared port, the embodiment causes the switch in the SDN to use the network settings of that controller. For example, suppose that controller 1's instruction provides that controller 1 manages the packets from a resource with MAC address A, and controller 2's instruction provides that controller 2 manages the packets from a resource with MAC address B. Further suppose that an example embodiment maintains the controller instructions as effective for 30 seconds. If within 30 seconds of controller 1's instruction, the shared port receives any packet from MAC address A, the embodiment causes the switch to apply controller 1's network settings for that packet. Similarly, if within 30 seconds of controller 2's instruction, the shared port receives any packet from MAC address B, the embodiment causes the switch to apply controller 2's network settings for that packet.

Operations based on other instructions proceed in a similar manner. The period of effectiveness may be different for different controllers.

A method of an embodiment described herein, when implemented to execute on a device or data processing system, comprises substantial advancement of the functionality of that device or data processing system in operating a shared port in a multi-tenant SDN. For example, presently available methods of supporting multiple tenants in an SDN require that each tenant use and have exclusive control of a port networking element in the data plane. An embodiment provides a method for sharing a port among two or more tenants that are operating concurrently in an SDN using their respective IaaS networks. This manner of sharing a port in a multi-tenant SDN is unavailable in the presently available methods. Thus, a substantial advancement of such devices or data processing systems by executing a method of an embodiment is in enabling multiple tenants to share a port when only a single port is available to receive data under certain circumstances in a cloud infrastructure.

The illustrative embodiments are described with respect to certain resources, ports, identifiers, instructions, extracted information, packets, manners of transmitting or receiving data, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
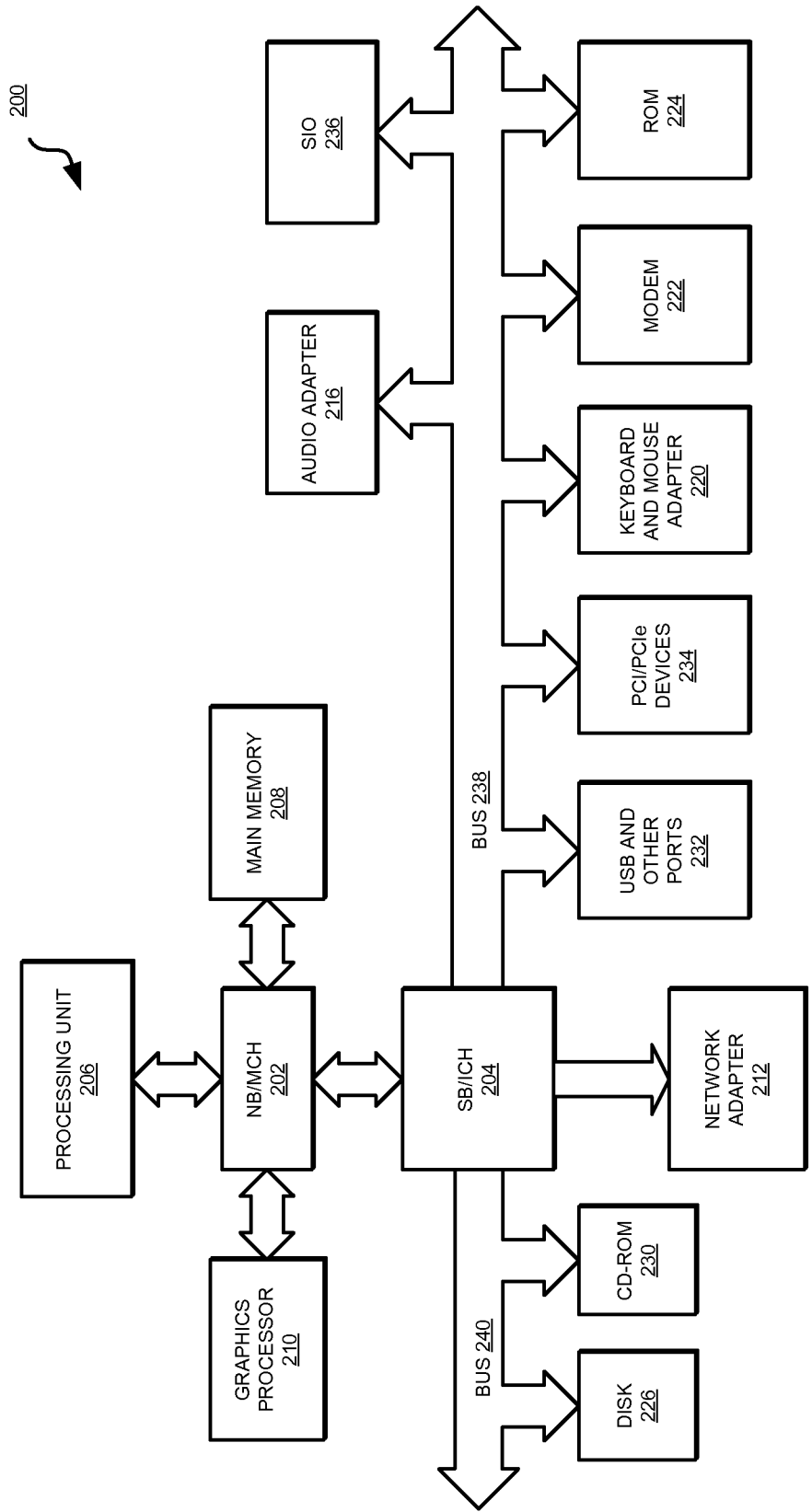
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Network 102 and the resources connected thereto forms data plane 101 over which SDN 142 is overlaid. Data plane 101 includes data processing system components, such as hypervisor 103, and physical networking components, such as switches 102A, 102B, 102C, and 102D. SDN 142 implements virtual representations of one or more of switches 102A-D. For example, switch 144 in SDN 142 is a virtual representation of one of physical switches 102A-D in data plane 101. SDN 142 operates SDN controller 146 for one tenant and SDN controller 148 for another tenant. Application 105 implements an embodiment described herein and operates in conjunction with switch 144 to provide SDN controllers 146 and 148 access to a shared port. For example, if switch 144 represents switch 102A, application 105 allows controllers 146 and 148 to use shared port 102A1 of switch 102A.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 and switches 102A-D in FIG. 1 in which computer usable program code or instructions implementing the processes of the illustrative embodiments may be located. Data processing system 200 is described as a computer only as an example, without being limited thereto. Implementations in the form of other devices, such as device 132 and switches 102A-D in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
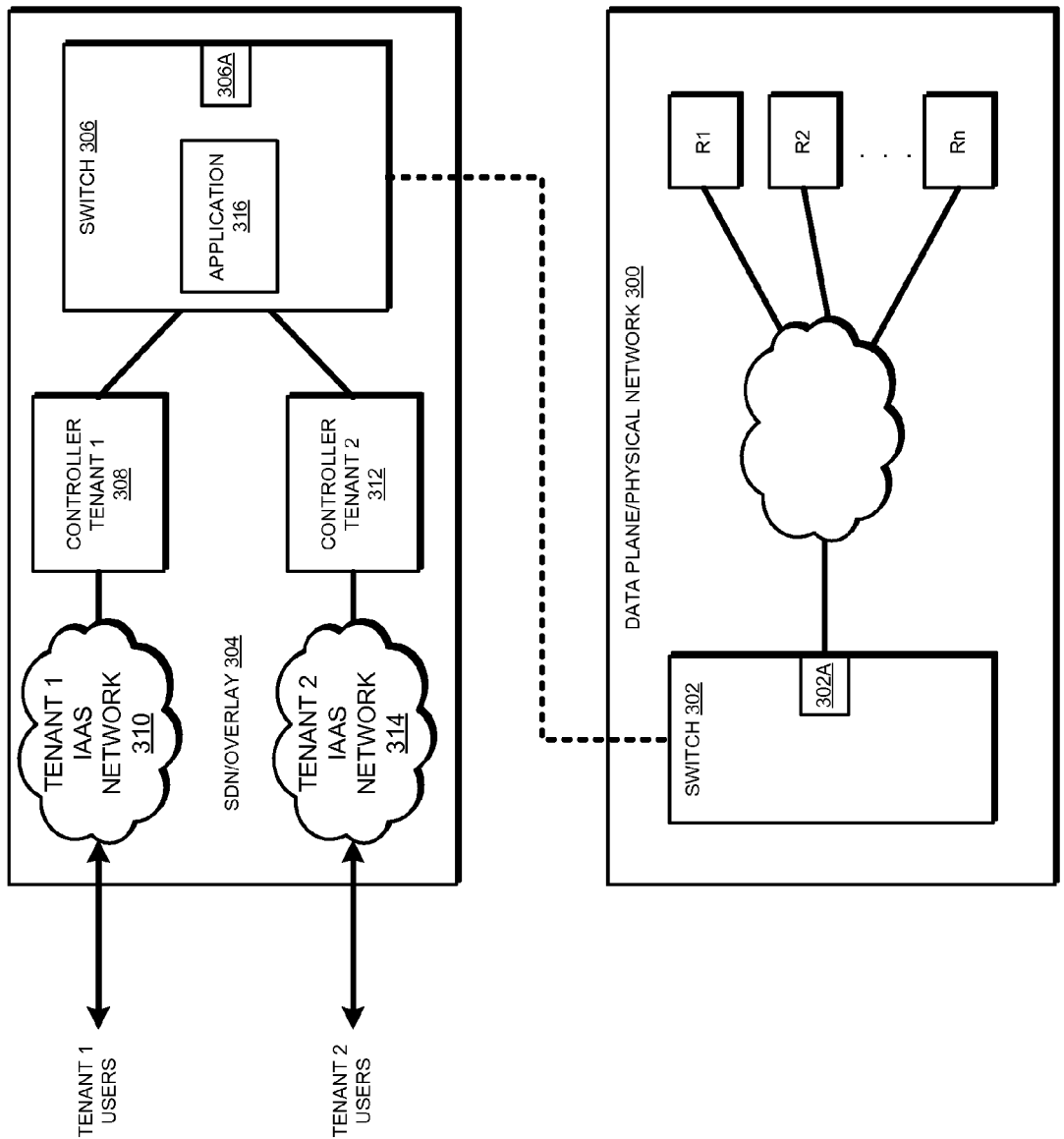
FIG. 3 depicts a block diagram of an example configuration for operating a shared port in a multi-tenant SDN in accordance with an illustrative embodiment.

With reference to FIG. 3, this figure depicts a block diagram of an example configuration for operating a shared port in a multi-tenant SDN in accordance with an illustrative embodiment. Data plane 300 is an example of data plane 101 in FIG. 1. Switch 302 is an example of switch 102A in FIG.

1. Shared port 302A is an example of shared port 102A1 in FIG. 1. SDN 304 is an example of SDN 142 in FIG. 1. Switch 306 is an example of switch 144 in FIG. 1.

Controller 308 is an SDN controller that operates in SDN 304 to provide the users of tenant 1's IaaS network 310 access to resources in data plane 300. Controller 312 is another SDN controller that operates in SDN 304 to provide the users of tenant 2's IaaS network 314 access to resources in data plane 300, such as to one or more of resources R1, R2 . . . Rn.

Application 316 executes in conjunction with switch 306 in any suitable configuration. Application 316 is depicted within switch 306 only as a non-limiting configuration. Shared port 306A represents shared port 302A.

Application 316 receives an instruction from controller 308, 310, or both. The instruction includes information as described herein. Application 316 examines a packet available at port 306A to extract certain information in a manner described herein. The packet at port 306A is a result of a resource, such as resource R1 sending the packet to port 302A in data plane 300. For example, application 316 may extract an identifier, which is provided by resource R1, from an address portion of the packet. As another example, application 316 may extract or determine a content type from a content portion of the packet. As another example, application 316 may obtain or determine control information associated with the packet, the control information being available in the packet or at switch 306.

Figure 4:
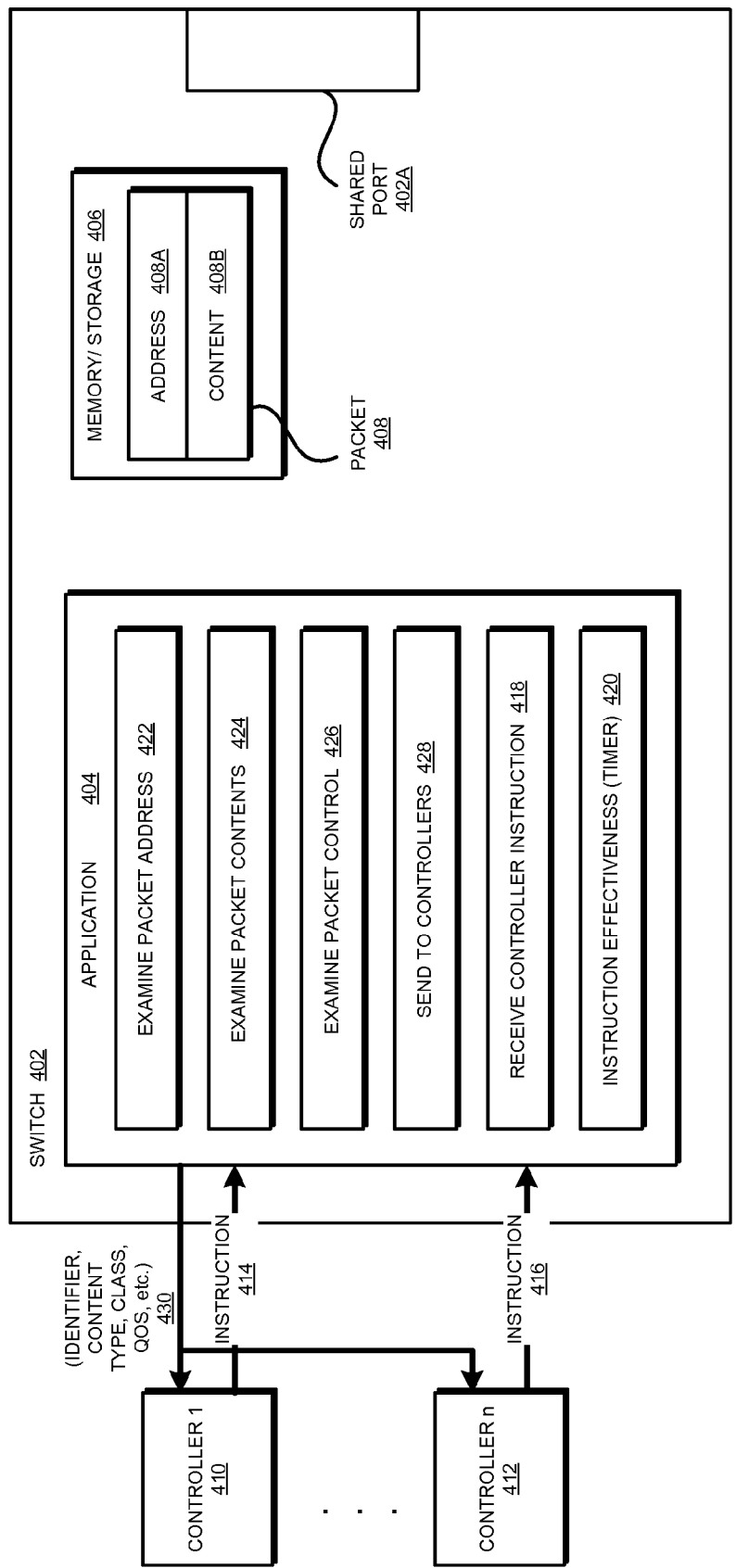
FIG. 4 depicts an example configuration of an application for operating a shared port in a multi-tenant SDN in accordance with an illustrative embodiment.

With reference to FIG. 4, this figure depicts an example configuration of an application for operating a shared port in a multi-tenant SDN in accordance with an illustrative embodiment. Switch 402 is an example of switch 306 in FIG. 3. Shared port 402A is an example of shared port 306A in FIG. 3. Application 404 is an example of application 316 in FIG. 3.

Memory 406 is available for use to switch 402. Packet 408 is a packet received at shared port 402A, which switch 402 saves in memory 406. Packet 408 includes address portion 408A and content portion 408B.

Controller 410 labeled "controller 1" is an SDN controller configured in tenant 1's IaaS network in the manner of controller 308 in FIG. 3. Any number of SDN controllers can be similarly configured for any number of co-operating tenants. Controller 412 labeled "controller n" is an SDN controller configured in tenant n's IaaS network in the manner of controller 314 in FIG. 3.

According to one embodiment, application 404 receives instruction 414 from controller 410 and instruction 416 from controller 412. Particularly, receiving instructions 414 and 416 is independent of the availability of packet 408 in memory 406. In one example case, no packets may exist in memory 406 when instructions 414, 416, or both are received at application 404.

Component 418 receives instruction 414 from controller 410. Component 420 initiates an instruction effectiveness period, and instruction 414 will remain effective for all packets received at shared port 402A during the period as described herein. Component 418 receives instruction 416 and component 420 configures a period of effectiveness for instruction 416 in a similar manner, independent of the receiving and configuring of the timer for instruction 414.

According to another embodiment, application 404 detects the availability of packet 408. Application 404 further detects that an instruction to select a controller for packet 408 is either absent or the period of effectiveness of the instruction has expired.

Component 422 examines address portion 408A to determine an identifier provided by the resource that sent packet 408. Component 422 extracts the identifier.

Component 424, optionally, examines content portion 408B to determine an additional feature of packet 408, such as a type of the content in packet 408. Component 424 extracts the additional feature.

Component 426, optionally, examines packet 408 or other information (not shown) in switch 402 to determine a control information associated with packet 408, such as a type of the content in packet 408. Component 426 extracts the control information.

Component 428 sends information 430 extracted by components 422, 424, and 426 to controllers 410 and 412. Each of controller 410 and 412 receives information 430 and determines whether that controller is configured to handle a packet that has information 430. Preferably, only one controller from controllers 410 and 412 will be configured to handle a packet that has information 430.

Suppose controller 410 is configured to handle a packet that has information 430. Controller 410 sends instruction 414 in response to receiving information 430, which component 418 receives as described herein. Component 420 initiates an instruction effectiveness timer. Controller 412 may not send any instruction, or may send a negative response indicating that controller 412 is not the controller that handles a packet that has information 430.

Figure 5:
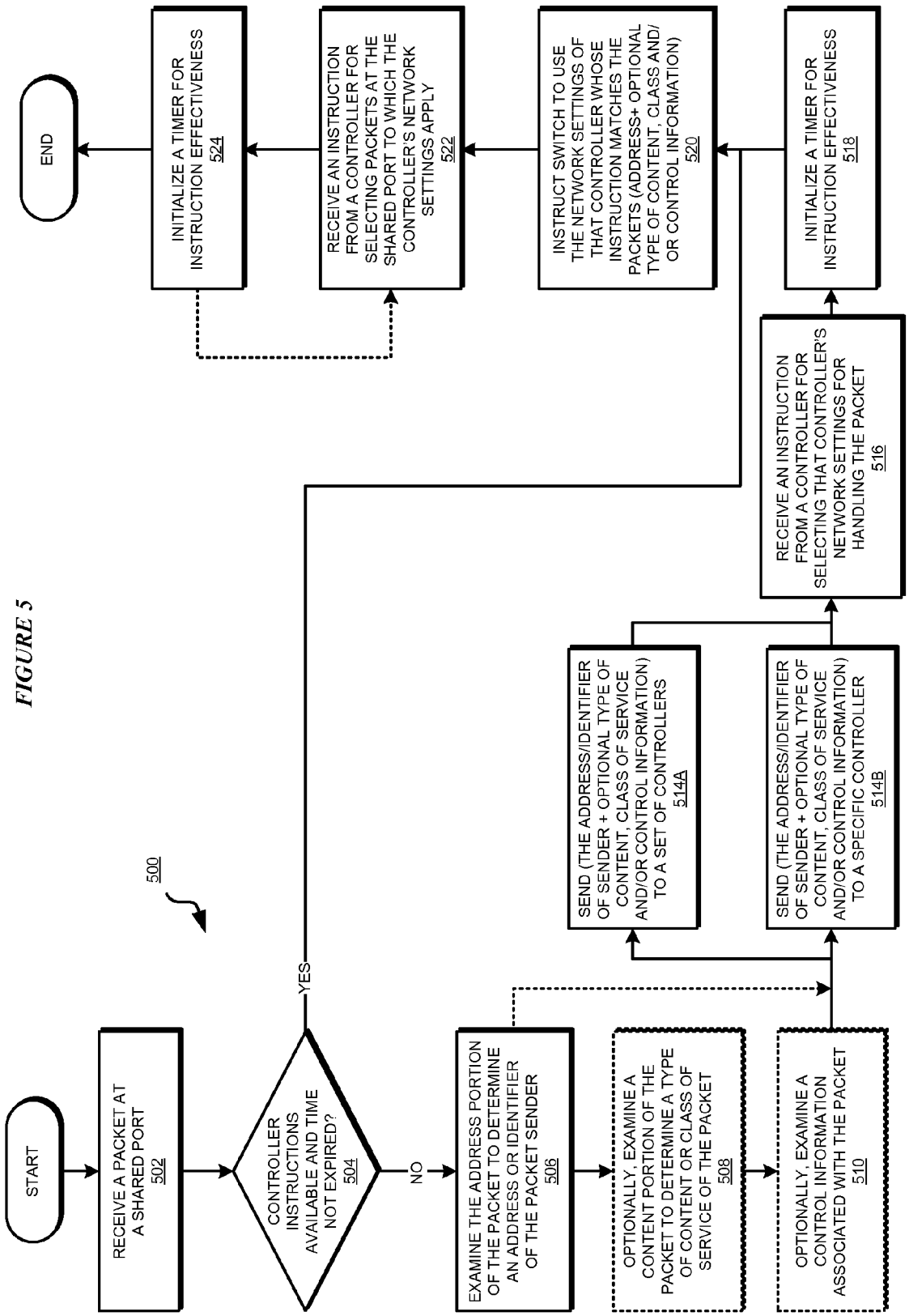
FIG. 5 depicts a flowchart of an example process for operating a shared port in a multi-tenant SDN in accordance with an illustrative embodiment.

With reference to FIG. 5, this figure depicts a flowchart of an example process for operating a shared port in a multi-tenant SDN in accordance with an illustrative embodiment. Process 500 can be implemented in application 404 in FIG. 4.

The application receives a packet at a shared port (block 502). The application determines whether a controller instruction, which is applicable to the packet received in block 502, is available and whose effectiveness timer has not expired (block 504). If such an instruction is available within the period of effectiveness ("Yes" path of block 504), the application proceeds to block 520.

If such an instruction is unavailable within the period of effectiveness ("No" path of block 504), the application examines the packet to determine an address or another identifier that identifies the sender of the packet or is usable to identify a sender-controller relationship in the SDN (block 506). Such an identifier is usually found in an address portion of the packet, but may be located elsewhere depending on the protocol for which the packet is constructed. The identifier can be positioned anywhere in the packet, and block 506 can find the identifier from any location in the packet without departing the scope of the illustrative embodiments. Thereafter, the application may proceed to block 514A or 514B as described herein.

Optionally, the application examines the packet to determine a type of the content or a class of service of the packet (block 508). Such information is usually determinable by examining a content portion of the packet, but may be located or determinable from information elsewhere in the packet depending on the protocol for which the packet is constructed. The operation of block 508 can make the determination based on similarly purposed information located anywhere in the packet without departing the scope of the illustrative embodiments.

Optionally, the application examines a control information associated with the packet (block 510). Such information is usually determinable by examining a content portion of the packet, but may be located or determinable from information elsewhere in the packet depending on the protocol for which the packet is constructed. Such information may also be configured in or determinable from information in the switch where the packet is received. The operation of block 510 can make the determination based on similarly purposed information located anywhere in the packet or the switch without departing the scope of the illustrative embodiments.

The application can take one of two possible routes through process 500. In some cases, where the application cannot identify a particular target tenant controller, the application sends to a set of controllers operating in the SDN, the identifier extracted at block 506 (block 514A). Optionally, at block 514A, the application also sends to the set of controllers the information extracted or determined at blocks 508 and 510 when available. In some other cases, where the application can identify a particular target tenant controller from the packet, the application sends to a specific controller, the identifier extracted at block 506 (block 514B). Optionally, at block 514B, the application also sends to the set of controllers the information extracted or determined at blocks 508 and 510 when available.

The application receives an instruction, preferably from one controller in the set of controllers, where the instruction informs the application to select the instructing controller's network settings for handling the packet (block 516). The application initializes a timer for measuring a period of effectiveness of the instruction (block 518).

The application instructs the switch, where the shared port is located, to use the network settings of that controller whose instruction matches the information of the packet (block 520). The application receives an instruction from that controller (block 522). The instruction informs the application about which packets arriving at a shared port in the future should be selected for handling according to the instructing controller's network settings. The application initializes a timer for measuring a period of effectiveness of the instruction (block 524). The application may receive instructions in block 522 and set corresponding timers in block 524 for more than one tenant controllers. The application ends process 500 thereafter.

Thus, a computer implemented method, system or apparatus, and computer program product are provided in the illustrative embodiments for operating a shared port in a multi-tenant SDN. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to the consumer by executing the application on a cloud infrastructure. The application is accessible from various client devices through a thin client interface such as a web browser (e.g., web-based e-mail). The user does not manage or control the underlying cloud infrastructure including network, servers, operating systems, storage, or even the capabilities of the application, with the possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
  requesting an instruction from a set of controllers;
  receiving, at an application executing using a processor, the instruction from a controller, the controller being a member of the set of controllers, the controller being a Software Defined Network (SDN) controller operating in an SDN;
  determining, using the processor, that the instruction applies to an identifier located in a data packet, the data packet passing through a shared port, the shared port being shared by the controller and a concurrently operating second controller in the SDN;
  initializing a period of effectiveness of the instruction; and
  sending a command to a switch to apply a network setting configured by the controller to handle the data packet, wherein the shared port is located at the switch in the SDN.

2. The method of claim 1, wherein the data packet is received after the instruction is provided by the controller.

3. The method of claim 1, further comprising:
  receiving the data packet at the shared port;
  extracting an identifier from the data packet; and
  sending the identifier in a message to a set of controllers concurrently operating in the SDN, wherein receiving the instruction from the controller is responsive to sending the identifier.

4. The method of claim 3, further comprising:
  determining a type of content in the data packet; and
  sending, with the identifier, the type of content to the set of controllers.

5. The method of claim 3, further comprising:
  determining a class of service of the data packet; and
  sending, with the identifier, the class of service to the set of controllers.

6. The method of claim 3, further comprising:
  determining a control information associated with the data packet; and
  sending, with the identifier, the control information to the set of controllers.

7. The method of claim 6, wherein the control information is a Quality of Service parameter configured for the data packet at the switch where the shared port is located.

8. The method of claim 6, wherein the control information is a priority parameter configured for the data packet at the switch where the shared port is located.

9. The method of claim 6, wherein the control information is a parameter configured in the data packet.

10. The method of claim 1, wherein only one controller from the set of controllers provides the instruction applicable to the data packet, the controller being the only one controller.

11. The method of claim 1, wherein the second controller in the set of controllers provides a second instruction, the second instruction being applicable to a second data packet that is received at the shared port.

12. The method of claim 1, wherein the second data packet is received after the second controller has provided the second instruction.

13. The method of claim 1, wherein the application is executing in a data processing system other than a physical switch where a physical port corresponding to the shared port is located.

14. The method of claim 1, wherein the application is executing in a physical switch where a physical port corresponding to the shared port is located.

15. The method of claim 1, wherein the method is embodied in a computer program product comprising one or more computer-readable storage devices and computer-readable program instructions which are stored on the one or more computer-readable storage devices and executed by one or more processors.

16. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

17. A computer program product comprising one or more computer-readable storage devices, and program instructions stored on at least one of the one or more storage devices, the stored program instructions comprising:
  program instructions to request an instruction from a set of controllers;
  program instructions to receive, at an application executing using a processor, the instruction from a controller, the controller being a member of the set of controllers, the controller being a Software Defined Network (SDN) controller operating in an SDN;
  program instructions to determine that the instruction applies to an identifier located in a data packet, the data packet passing through a shared port, the shared port being shared by the controller and a concurrently operating second controller in the SDN;
  program instructions to initialize a period of effectiveness of the instruction; and
  program instructions to send a command to a switch to apply a network setting configured by the controller to handle the data packet, wherein the shared port is located at the switch in the SDN.

18. The computer program product of claim 17, wherein the data packet is received after the instruction is provided by the controller.

19. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
  program instructions to request an instruction from a set of controllers;
  program instructions to receive, at an application executing using a processor, the instruction from a controller, the controller being a member of the set of controllers, the controller being a Software Defined Network (SDN) controller operating in an SDN;
  program instructions to determine that the instruction applies to an identifier located in a data packet, the data packet passing through a shared port, the shared port being shared by the controller and a concurrently operating second controller in the SDN;
  program instructions to initialize a period of effectiveness of the instruction; and
  program instructions to send a command to a switch to apply a network setting configured by the controller to handle the data packet, wherein the shared port is located at the switch in the SDN.

* * * * *